US012620312B2

(12) United States Patent
Sugiura et al.

(10) Patent No.: US 12,620,312 B2
(45) Date of Patent: May 5, 2026

(54) MANAGEMENT SYSTEM

(71) Applicant: TOYOTA JIDOSHA KABUSHIKI KAISHA, Toyota (JP)

(72) Inventors: Tetsuro Sugiura, Chofu (JP); Nobutsugu Maruiwa, Mishima (JP); Tatsuya Sugano, Sunto-gun (JP); Soichiro Oura, Chofu (JP); Hiroya Chiba, Fuji (JP); Ryuji Okamura, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 18/760,552

(22) Filed: Jul. 1, 2024

(65) Prior Publication Data

US 2025/0046189 A1 Feb. 6, 2025

(30) Foreign Application Priority Data

Aug. 1, 2023 (JP) ................................. 2023-125824

(51) Int. Cl.
G08G 1/14 (2006.01)
B60Q 9/00 (2006.01)
H04W 4/44 (2018.01)

(52) U.S. Cl.
CPC ............... G08G 1/148 (2013.01); B60Q 9/00 (2013.01); H04W 4/44 (2018.02)

(58) Field of Classification Search
CPC ...................................................... G08G 1/148
See application file for complete search history.

(56) References Cited

U.S. PATENT DOCUMENTS

| | | | | |
|---|---|---|---|---|
| 5,402,106 A * | 3/1995 | DiPaolo | ............... | B62B 3/1404 |
| | | | | 340/568.5 |
| 11,450,208 B2 * | 9/2022 | Badouin | ............... | G07F 17/246 |
| 2002/0101365 A1 * | 8/2002 | Flick | ..................... | B60R 25/102 |
| | | | | 340/988 |
| 2005/0026627 A1 * | 2/2005 | Boling | .................... | B60R 25/00 |
| | | | | 455/456.1 |
| 2009/0212978 A1 * | 8/2009 | Ramseyer | ............ | G07C 5/0808 |
| | | | | 701/31.4 |
| 2015/0193726 A1 * | 7/2015 | Simmons | ............. | G06Q 10/087 |
| | | | | 705/28 |
| 2018/0039844 A1 * | 2/2018 | Nordbruch | ................ | B60T 7/12 |
| 2019/0174279 A1 * | 6/2019 | Verma | .................. | G07B 15/063 |

(Continued)

FOREIGN PATENT DOCUMENTS

| | | |
|---|---|---|
| JP | 2018-505488 A | 2/2018 |
| JP | 2021-128459 A | 9/2021 |

(Continued)

*Primary Examiner* — Davetta W Goins
*Assistant Examiner* — Pameshanand Mahase
(74) *Attorney, Agent, or Firm* — OLIFF PLC.

(57) ABSTRACT

A management system includes a management server capable of wirelessly communicating with a vehicle in a parking lot, and an alarm provided on or near the vehicle and configured to emit sound or light or both in response to an instruction from the management server. The management server executes control for operating the alarm corresponding to the vehicle when detecting occurrence of an event requiring confirmation of a state of the vehicle via wireless communication with the vehicle.

4 Claims, 6 Drawing Sheets

1: MANAGEMENT SYSTEM

(56)  References Cited

U.S. PATENT DOCUMENTS

| 2020/0058210 A1* | 2/2020 | Williams | ................ G07C 5/08 |
| 2021/0248386 A1 | 8/2021 | Takato | |
| 2021/0316718 A1 | 10/2021 | Sugano | |

FOREIGN PATENT DOCUMENTS

| JP | 2021-166018 A | 10/2021 |
| JP | 2021-189901 A | 12/2021 |

* cited by examiner

1: MANAGEMENT SYSTEM

| CASE | PARAMETER | | NOTIFICATION OF SURROUNDINGS | TARGET ALARM |
|---|---|---|---|---|
| | RESPONSE FROM VEHICLE | VEHICLE STATUS | | |
| 1 | YES | NORMAL | UNNECESSARY | NONE |
| 2 | | ABNORMAL | NECESSARY | AT LEAST ONE OF THE FIRST AND SECOND ALARMS |
| 3 | NO | UNKNOWN | NECESSARY | SECOND ALARM |

FIG. 3A

| CASE | PARAMETER | | NOTIFICATION OF SURROUNDINGS | TARGET ALARM |
|---|---|---|---|---|
| | REQUESTS FROM MANAGEMENT SERVER | VEHICLE STATUS | | |
| 4 | YES | NORMAL | UNNECESSARY | NONE (EQUIVALENT TO CASE1) |
| 5 | | ABNORMAL | NECESSARY | FOLLOW INSTRUCTION MANAGEMENT SERVER (EQUIVALENT TO CASE2) |
| 6 | NO | NORMAL | UNNECESSARY | NONE |
| 7 | | ABNORMAL | NECESSARY | FIRST ALARM |

FIG. 3B

CASE 1 AND 4

CASE 2 AND 5

CASE 3

CASE 6

CASE 7

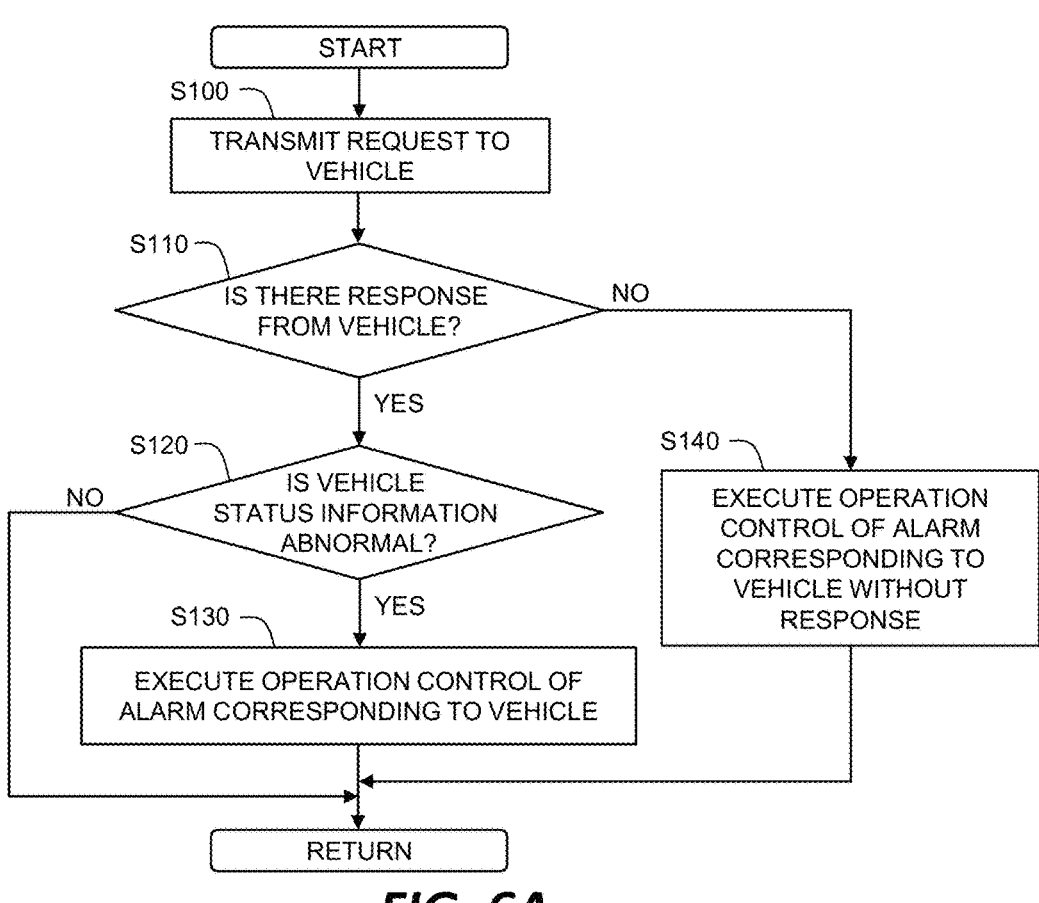

START

S100 ⌐ TRANSMIT REQUEST TO VEHICLE

S110 ⌐ IS THERE RESPONSE FROM VEHICLE?

NO

YES

S120 ⌐ IS VEHICLE STATUS INFORMATION ABNORMAL?

NO

YES

S140 ⌐ EXECUTE OPERATION CONTROL OF ALARM CORRESPONDING TO VEHICLE WITHOUT RESPONSE

S130 ⌐ EXECUTE OPERATION CONTROL OF ALARM CORRESPONDING TO VEHICLE

RETURN

*FIG. 6A*

START

S200 ⌐ NO REQUEST FROM MANAGEMENT SERVER?

NO

YES

S210 ⌐ IS VEHICLE STATUS INFORMATION ABNORMAL?

NO

YES

S230 ⌐ TRANSMIT RESPONSE TO REQUEST TO MANAGEMENT SERVER

S220 ⌐ EXECUTE OPERATION CONTROL OF ALARM OF OWN VEHICLE

S110

RETURN

*FIG. 6B*

MANAGEMENT SYSTEM

CROSS-REFERENCE TO RELATED APPLICATION

The present application claims priority under 35 U.S.C. § 119 to Japanese Patent Application No. 2023-125824, filed on Aug. 1, 2023, the contents of which application are incorporated herein by reference in their entirety.

BACKGROUND

Technical Field

The present disclosure relates to a technique for managing a parking lot in which an automated parking service is provided to a vehicle.

Background Art

JP 2018505488 A discloses a system for detecting a person in an automated valet parking (AVP) vehicle. In this prior art, vehicle sensors are used to determine whether a person is in the AVP vehicle. By ensuring that no persons remain in the AVP vehicle, automatic parking is prevented from being disturbed.

SUMMARY

In the AVP system, when a vehicle to be controlled needs to be moved by a person due to a failure or the like, a staff member in a parking lot needs to identify the failed vehicle. In this case, it may be difficult for the staff to identify the failed vehicle. In particular, in a parking lot where vehicles of the same vehicle type are parked side by side, it is difficult to make a determination based on the vehicle number or the parking frame. Therefore, it may take a long time to search for the failed vehicle. The above-mentioned JP 2018505488 A is a system that monitors an AVP vehicle by a system and detects a person inside the vehicle, and does not provide a solution to this problem.

An object of the present disclosure is to provide a technique that can easily find a failed vehicle even when an AVP vehicle is failed and it is difficult to identify the location of the vehicle.

A first aspect of the present disclosure relates to a management system that manages a parking lot in which an automated parking service to a vehicle. The management system includes a management server capable of wirelessly communicating with the vehicle in the parking lot, and an alarm provided on or near the vehicle and configured to emit sound or light or both in response to an instruction from the management server. The management server is configured to activate the alarm corresponding to the vehicle when detecting occurrence of an event requiring confirmation of a state of the vehicle via wireless communication with the vehicle.

A second aspect of the present disclosure further has the following features in addition to the first aspect. The vehicle is configured to activate the alarm when the communication with the management server is in an unstable state.

A third aspect of the present disclosure further has the following features in addition to the first aspect. The alarm is an infrastructure equipment installed in the parking lot.

A fourth aspect of the present disclosure further has the following features in addition to the first aspect. The management server is configured to change an operation mode of the alarm in accordance with a content of the event.

A fifth aspect of the present disclosure further has the following features in addition to the first aspect. The management server is configured to transmit information on a vehicle position where the event is detected to a portable terminal carried by a staff of the parking lot.

According to the present disclosure, when an event that requires confirmation of the state of the vehicle occurs, control is performed to cause the alarm corresponding to the vehicle to operate so as to emit sound or light or both. This makes it possible to notify the surroundings of the presence of the vehicle in which the event has occurred. Therefore, the location of the vehicle in which the event has occurred can be quickly identified, and thus the time required to find the vehicle can be shortened.

BRIEF DESCRIPTION OF DRAWINGS

FIG. 3A is a diagram for explaining a specific example of the management system according to the embodiment;

FIG. 3B is a diagram for explaining a specific example of the management system according to the embodiment;

FIG. 6A is a flowchart showing an example of processing of the management system according to the embodiment; and FIG. 6B is a flowchart showing an example of processing of the management system according to the embodiment.

DESCRIPTION OF EMBODIMENT

Figure 1:
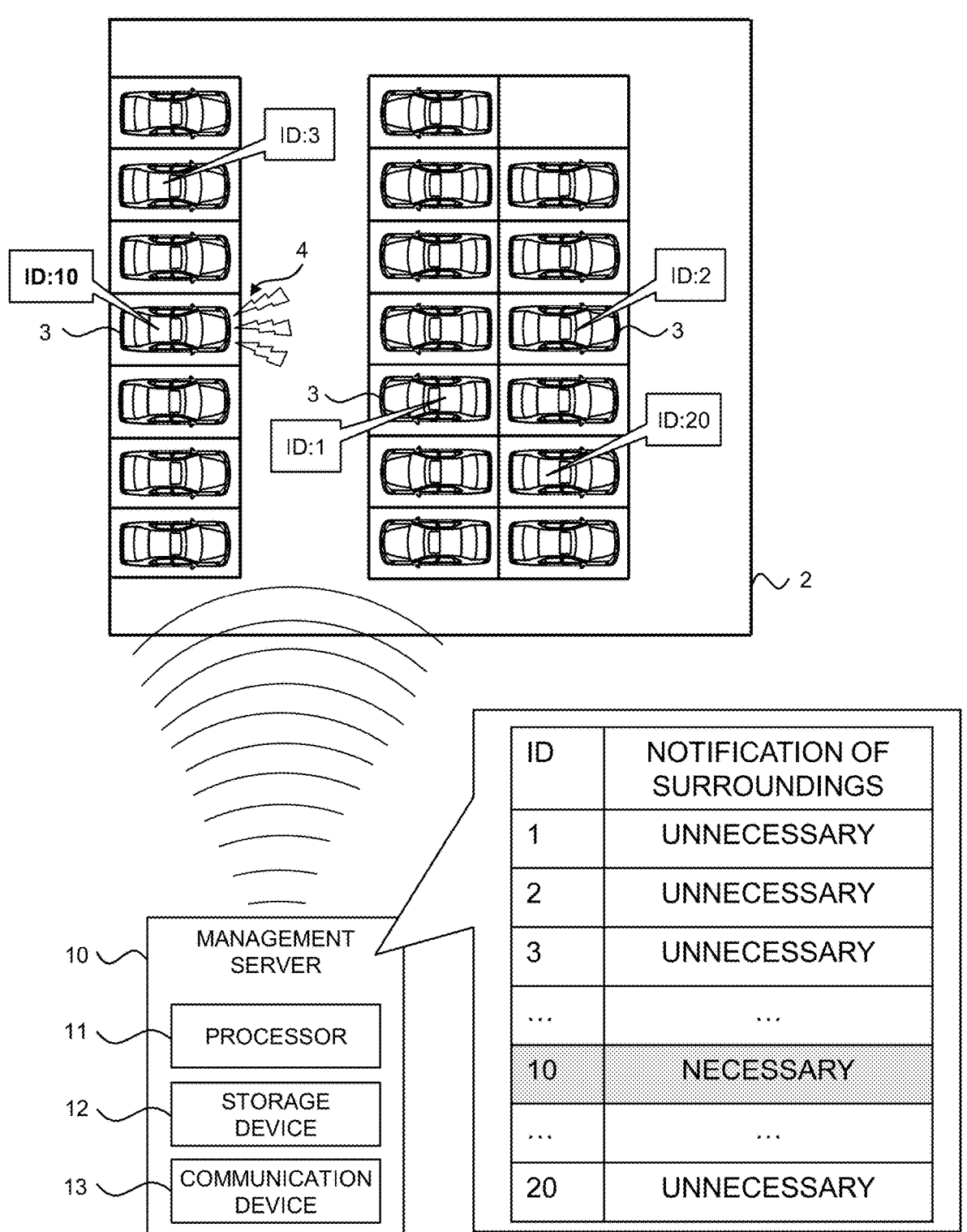
FIG. 1 is a diagram for explaining an outline of a management system according to an embodiment.

A management system according to an embodiment of the present disclosure will be described with reference to the accompanying drawings. In addition, the same reference numerals are given to the same elements in the drawings, and the overlapping description will be omitted.

1. OUTLINE

FIG. 1 is a diagram for explaining an outline of a management system 1 according to an embodiment. The management system 1 manages a parking lot 2 in which an automated parking service is provided to a vehicle 3. The automated parking service is used in, for example, a rental car service for renting the vehicle 3. The vehicle 3 has a function of performing automatic valet parking. A vehicle having a function of automatic valet parking is referred to as an AVP vehicle. The AVP vehicle may be a vehicle that performs automatic driving or a vehicle that performs manual driving.

The management system 1 includes an alarm 4 and a management server 10. The alarm 4 is, for example, a device that emits sound or light or both in response to an instruction from the management server 10. The details of the alarm 4 will be described later.

The management server 10 includes a processor 11, a storage device 12, and a communication device 13. The processor 11 executes various processes for managing the parking lot 2. Specifically, the processor 11 performs the storage and retrieval management of the vehicle 3 parked in the parking lot 2. The processor 11 performs maintenance management for maintaining the vehicle 3 in a normal state.

The storage device 12 stores a management program (not shown). The management program is a computer program executed by the processor 11. The processor 11 executes the management program, thereby realizing the functions of the management system 1.

The communication device 13 is a device capable of wirelessly communicating with the vehicle 3.

The management server 10 performs the following process in the maintenance management of the vehicle 3. Specifically, the management server 10 transmits a request to the target vehicle 3 or all the vehicles 3 existing in the parking lot 2 so as to respond with the identification information ID of the vehicle 3 and the vehicle status information indicating whether the state of the vehicle 3 is normal. The identification information ID is, for example, a vehicle number, a management number assigned by a company of the automated parking service, or the like.

Further, the management server 10 detects whether an event that requires confirmation of the state of the vehicle 3 has occurred, based on the identification information ID received from the vehicle 3 and the vehicle status information corresponding to the identification information ID. For example, when the vehicle status information is "normal", the management server 10 determines that an event that requires confirmation of the state of the vehicle 3 has not occurred. On the other hand, when the vehicle status information is "abnormal", the management server 10 detects that an event that requires confirmation of the state of the vehicle 3 has occurred. A specific processing example will be described later.

Thereafter, the management server 10 executes control to operate the alarm 4 corresponding to the vehicle 3 that has detected the occurrence of the event. A specific example of control for operating the alarm 4 will be described later.

In the example illustrated in FIG. 1, the management server 10 determines that an event that requires confirmation of the state of the vehicle 3 has occurred in the vehicle 3 having the identification information ID of "10" among the 20 vehicles 3 parked in the parking lot 2. The management server 10 executes control for operating the alarm 4 corresponding to the vehicle 3 having the identification information ID "10". Thus, the staff of the parking lot 2 can be notified of the vehicle 3 in which the event has occurred.

Figure 2:
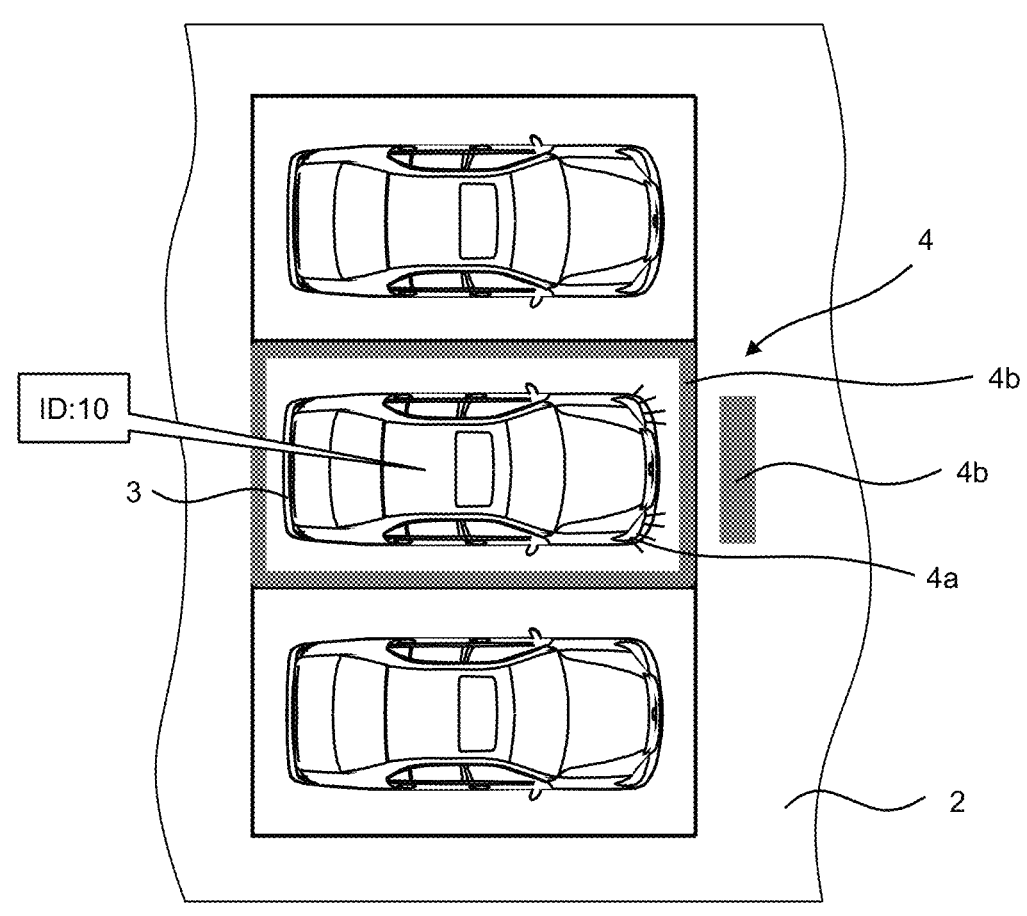
FIG. 2 is a diagram for explaining an outline of the management system according to the embodiment.

FIG. 2 is a diagram for explaining an outline of the alarm 4. The alarm 4 includes a first alarm 4a conventionally provided in the vehicle 3 and a second alarm 4b provided in the vicinity of the vehicle 3. Examples of the first alarm 4a include lights (headlights and the like), lamps (blinker lamps, hazard lamps, and the like), horns, speakers (navigation voice and the like), approach sounds mounted on hybrid vehicles and the like, and a crime prevention buzzer. Examples of the second alarm 4b include infrastructure equipment such as a marker that can be turned on or blinked provided near or around the parking frame, a light that can illuminate the parking frame from above, and a speaker installed near the parking frame.

In the example illustrated in FIG. 2, the headlights of the vehicles 3, which are the first alarm devices 4a, are turned on, and the markers near the parking frame and the markers around the parking frame, which are the second alarm devices 4b, are turned on. In addition to this example, a specific situation of the vehicle 3 may be transmitted by a navigation voice using a speaker mounted on the vehicle 3. For example, by announcing the identification information ID of the vehicle 3 and the number of the parking space by voice, the staff of the parking lot 2 can more easily find the vehicle 3 in which the event has occurred.

According to the management system 1 of the embodiment, when it is detected that an event that requires confirmation of the state of the vehicle 3 present in the parking lot 2 has occurred, control is performed to activate the alarm 4 corresponding to the vehicle 3. When the control for activating the alarm 4 is performed, the first alarm 4a or the second alarm 4b emits sound or light, or both. A specific example of control for operating the alarm 4 will be described below.

2. SPECIFIC EXAMPLE

2-1. Example of Operation Control of Alarm

FIG. 3A and FIG. 3B are diagrams for explaining a specific example of control for operating the alarm 4 in the management system 1 according to the embodiment. As described above, the control for operating the alarm 4 is executed when it is detected that an event requiring the confirmation of the state of the vehicle 3 has occurred. The event that requires the confirmation of the state of the vehicle 3 is, for example, an abnormal state of the vehicle 3 or a poor communication state between the management server 10 and the vehicle 3. The abnormal state of the vehicle 3 is, for example, a vehicle failure, a malfunction of an in-vehicle sensor, insufficient charging, insufficient fuel, or the like.

Here, as an event in which the state of the vehicle 3 needs to be checked, a case where the communication state between the management server 10 and the vehicle 3 is bad will be considered. In this case, even if there is a vehicle 3 in which the event has occurred, the management server 10 cannot recognize the vehicle 3 and cannot execute control to operate the alarm 4 corresponding to the vehicle 3.

Therefore, in the management system 1 according to the embodiment, when the communication state between the management server 10 and the vehicle 3 is good, the management server 10 performs control to activate the alarm 4 corresponding to the vehicle 3 in which the event has occurred. On the other hand, when the communication state between the management server 10 and the vehicle 3 is in bad condition, the vehicle 3 executes control for operating the alarm 4 corresponding to the vehicle 3 in which the event has occurred.

An example in which the management server 10 operates the alarm 4 when the communication state between the management server 10 and the vehicle 3 is good is referred to as a first example, and an example in which the vehicle 3 operates the alarm 4 of the vehicle 3 when the communication state between the management server 10 and the vehicle 3 is bad is referred to as a second example. Hereinafter, the first example and the second example will be described in detail.

2-1-1. First Example

FIG. 3A shows a specific example of a first example in which the management server 10 operates the alarm 4. As shown in FIG. 3A, various parameters received from the vehicle 3 after the management server 10 transmits a request to the vehicle 3 to respond with the identification information ID and the vehicle status information are used for the determination of whether or not an event that requires confirmation of the state of the vehicle 3 has occurred. The various parameters include the presence or absence of a response from the vehicle 3 and vehicle status information.

Three cases (cases 1, 2, and 3) are examples of combinations of the presence or absence of a response from the vehicle 3 and the vehicle status information. Specifically, Case 1 shown in FIG. 3A shows an example of a case where there is a response from the vehicle 3 and the vehicle status information received from the vehicle 3 is normal. In this case, since an event that requires confirmation of the state of the vehicle 3 has not occurred and it is not necessary to notify the surroundings of the state of the vehicle 3, the management server 10 does not perform control to operate the alarm 4 corresponding to the vehicle 3.

Case 2 shown in FIG. 3A shows an example of a case where there is a response from the vehicle 3 and the vehicle status information received from the vehicle 3 is abnormal. In this case, since it is necessary to notify the surroundings that an event that requires confirmation of the state of the vehicle 3 has occurred, the management server 10 performs control to operate the alarm 4 corresponding to the vehicle 3. To be specific, the management server 10 executes control for operating at least one of the first alarm 4a and the second alarm 4b corresponding to the vehicles 3.

Case 3 shown in FIG. 3A shows an example of a case where there is no response from the vehicle 3. Even when the communication state between the management server 10 and the vehicle 3 is good, if some problem occurs on the vehicle 3 side, it is assumed that the vehicle 3 cannot return a response to the management server 10. In this case, it is necessary to notify the surroundings that an event that requires confirmation of the state of the vehicle 3 has occurred. Therefore, the management server 10 performs control to operate the second alarm 4b corresponding to the car 3.

2-1-2. Second Example

FIG. 3B shows a specific example in which the vehicle 3 operates the alarm 4 of the own vehicle. As shown in FIG. 3B, various parameters including the presence or absence of the request from the management server 10 and the vehicle status information are used for the determination of whether or not an event that requires confirmation of the state of the vehicle 3 has occurred. In addition, four cases (cases 4, 5, 6, and 7) are given as examples of combinations of the presence or absence of the request from the management server 10 and the vehicle status information. Since the cases 4 and 5 correspond to the cases 1 and 2, respectively, the cases 6 and 7 will be described below.

Specifically, Case 6 shown in FIG. 3B shows an example of a case where the request from the management server 10 is not received even after a predetermined time has elapsed, and the communication state between the management server 10 and the vehicle 3 is in a bad condition, but the vehicle status information is normal, and thus an event that requires confirmation of the state of the vehicle 3 does not occur. In this case, since it is not necessary to notify the surroundings of the state of the car 3, the car 3 does not execute the control of operating the first alarm 4a of the car.

Case 7 shown in FIG. 3B shows an example of a case where the request from the management server 10 is not received even after a predetermined time has elapsed, and the vehicle status information is abnormal. In this case, since the communication state between the management server 10 and the vehicle 3 is not good and the vehicle status information is abnormal, an event that requires confirmation of the state of the vehicle 3 has occurred. Therefore, the vehicles 3 need to notify the surroundings of the occurrence of an event that requires confirmation of the state of the vehicles 3, and thus the vehicles 3 execute control to activate the first alarm 4a of the vehicles 3.

2-2. Example of Operation Mode of Alarm

The management system 1 may change the operation mode of the alarm 4 corresponding to the vehicle 3 according to the state of various parameters used for determining whether an event requiring the confirmation of the state of the vehicle 3 has occurred. For example, when the degree of failure of the vehicle 3 is high, it is necessary to check the state of the vehicle 3 in a hurry. In this case, the management system 1 uses the alarm 4 that emits a sound so that the staff of the parking lot 2 can be immediately aware of the alarm 4. On the other hand, when the degree of failure of the vehicle 3 is low and the priority of checking the state of the vehicle 3 is low, the management system 1 may perform control to operate the alarm 4 by using the alarm 4 that emits light.

The management system 1 may operate the alarm 4 that emits sound and the alarm 4 that emits light in combination according to the content of the failure. Further, the management system 1 may set a periodic pattern for emitting sound or light in advance in accordance with the content of the failure.

3. PROCESSING EXAMPLE (SEQUENCE)

3-1. First Example

Figure 4A:
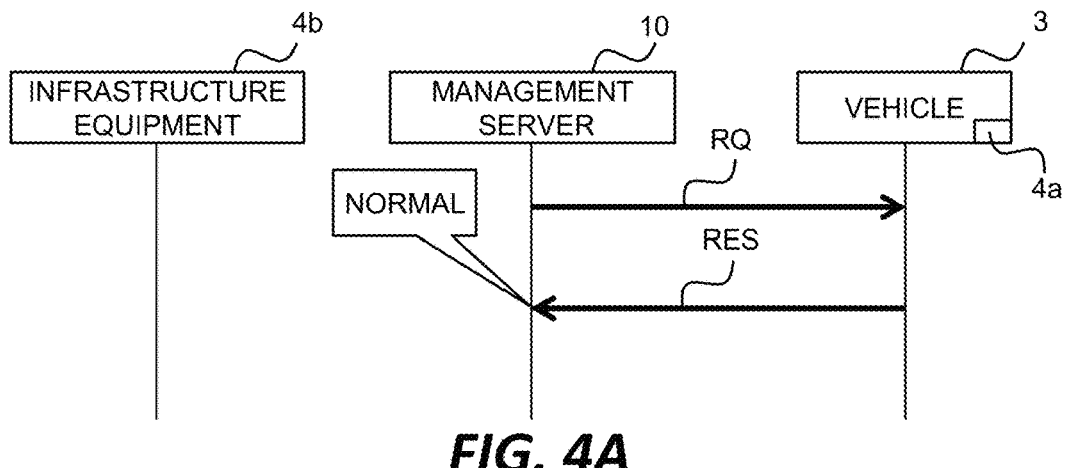
FIG. 4A is a sequence diagram showing an example of processing of the management system according to the embodiment.
Figure 4B:
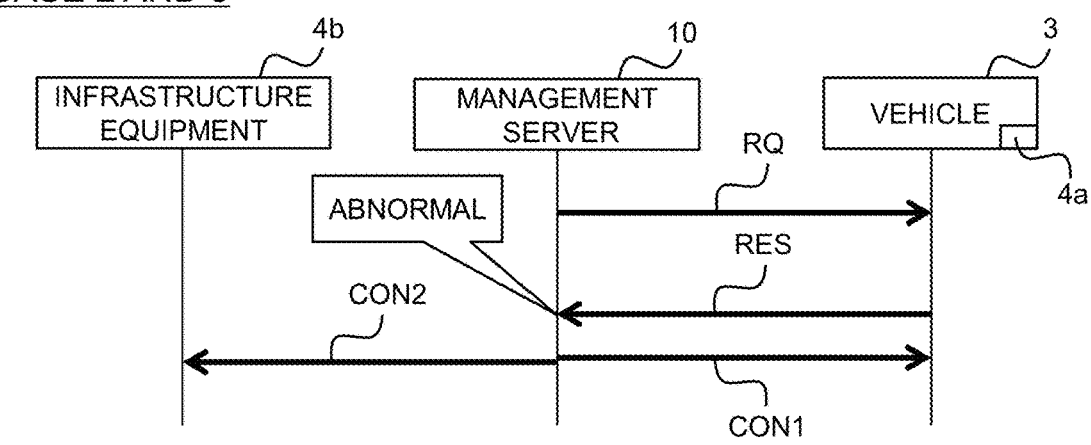
FIG. 4B is a sequence diagram showing an example of processing of the management system according to the embodiment.
Figure 4C:
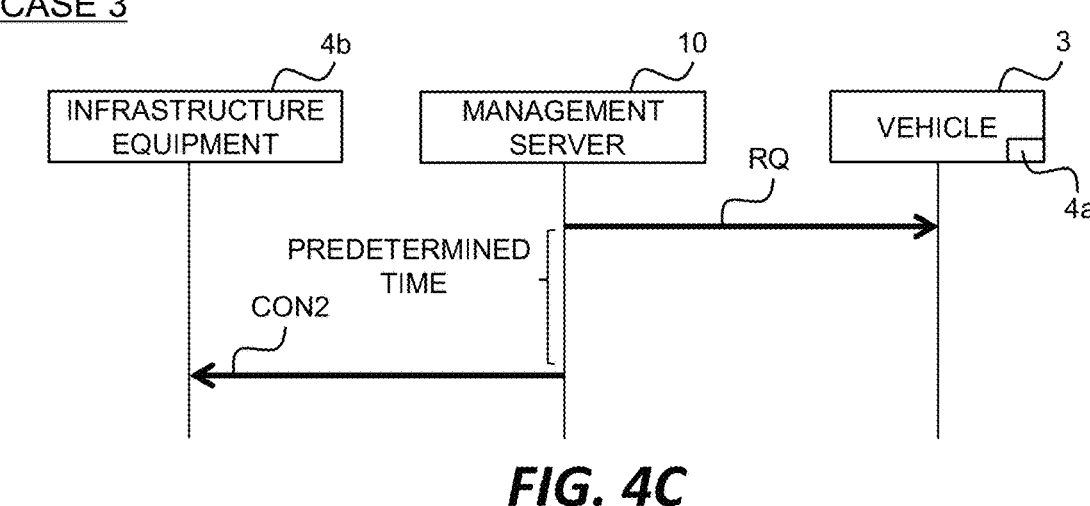
FIG. 4C is a sequence diagram showing an example of processing of the management system according to the embodiment.

FIG. 4A, FIG. 4B, and FIG. 4C are sequence diagrams illustrating a processing example of the first example in the management system 1 according to the embodiment. Specifically, FIG. 4A shows a sequence diagram in the case 1, FIG. 4B shows a sequence diagram in the case 2, and FIG. 4C shows a sequence diagram in the case 3. Each of these will be described in detail below.

First, the details of FIG. 4A will be described. The management server 10 transmits a request RQ to the vehicle 3 so as to respond with the identification information ID and the vehicle status information. When the vehicle status information included in the response RES from the vehicle 3 received by the management server 10 is normal, the management server 10 does not execute control for operating the alarm 4 corresponding to the vehicle 3.

Next, the details of FIG. 4B will be described. The management server 10 transmits a request RQ to the vehicle 3. When the vehicle status information included in the response RES from the vehicle 3 received by the management server 10 is abnormal, the management server 10 executes control to operate the alarm 4 corresponding to the vehicle 3. To be specific, the management server 10 executes at least one of the first operation control CON1 of the first alarm 4a corresponding to the vehicles 3 and the second operation control CON2 of the second alarm 4b corresponding to the vehicles 3.

Next, the details of FIG. 4C will be described. The management server 10 transmits a request RQ to the vehicle 3. When the response RES is not received from the vehicles 3 even after a predetermined time elapses from the transmission of the request RQ, the management server 10 executes the second activation control CON2 of the second alarm 4b corresponding to the vehicles 3.

As described above, since the case 4 in the second example of the control for operating the alarm 4 corresponds to the case 1 of the first example, the sequence of the case 4 is the same as the sequence of FIG. 4A. Further, since the case 5 in the second example of the control for operating the alarm 4 corresponds to the case 2 in the first example, the sequence in the case 5 is the same as the sequence in FIG. 4B. In a sequence diagram of a second example described later, the case 6 and the case 7 will be described in detail while omitting the description of the case 4 and the case 5.

3-2. Second Example

Figure 5A:
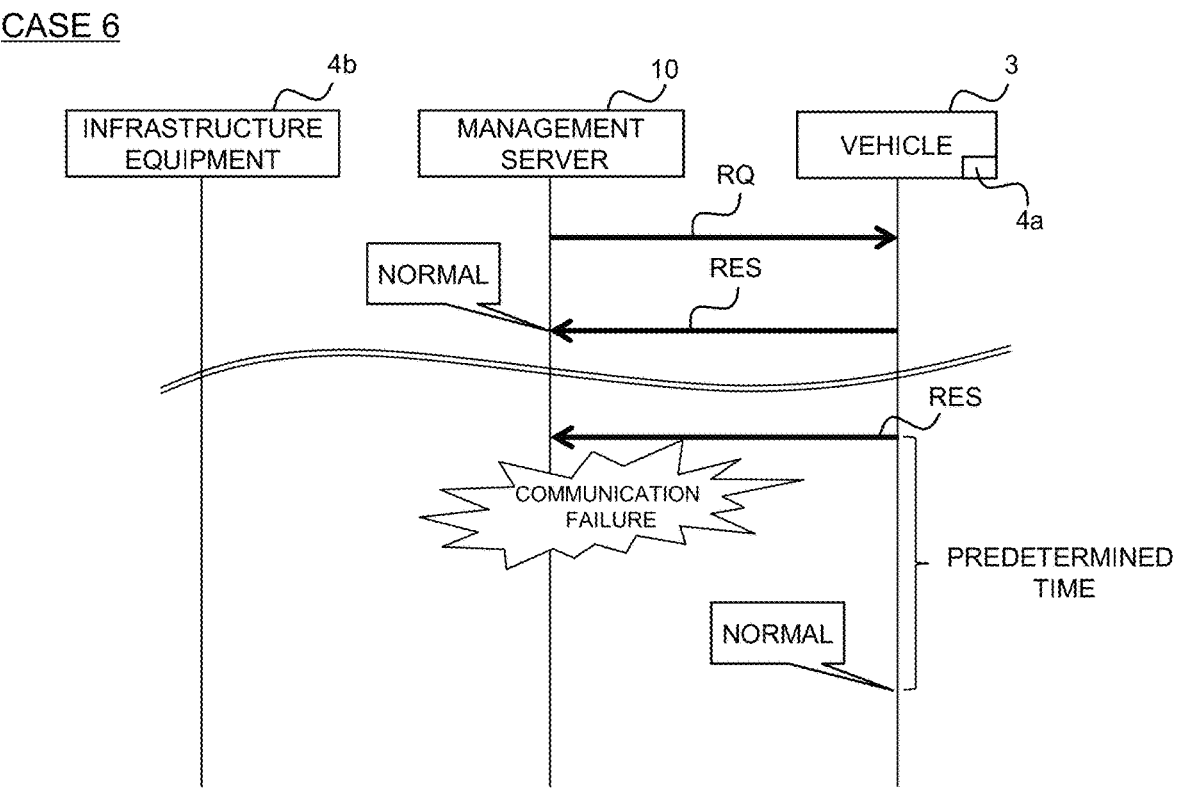
FIG. 5A is a sequence diagram showing an example of processing of the management system according to the embodiment.
Figure 5B:
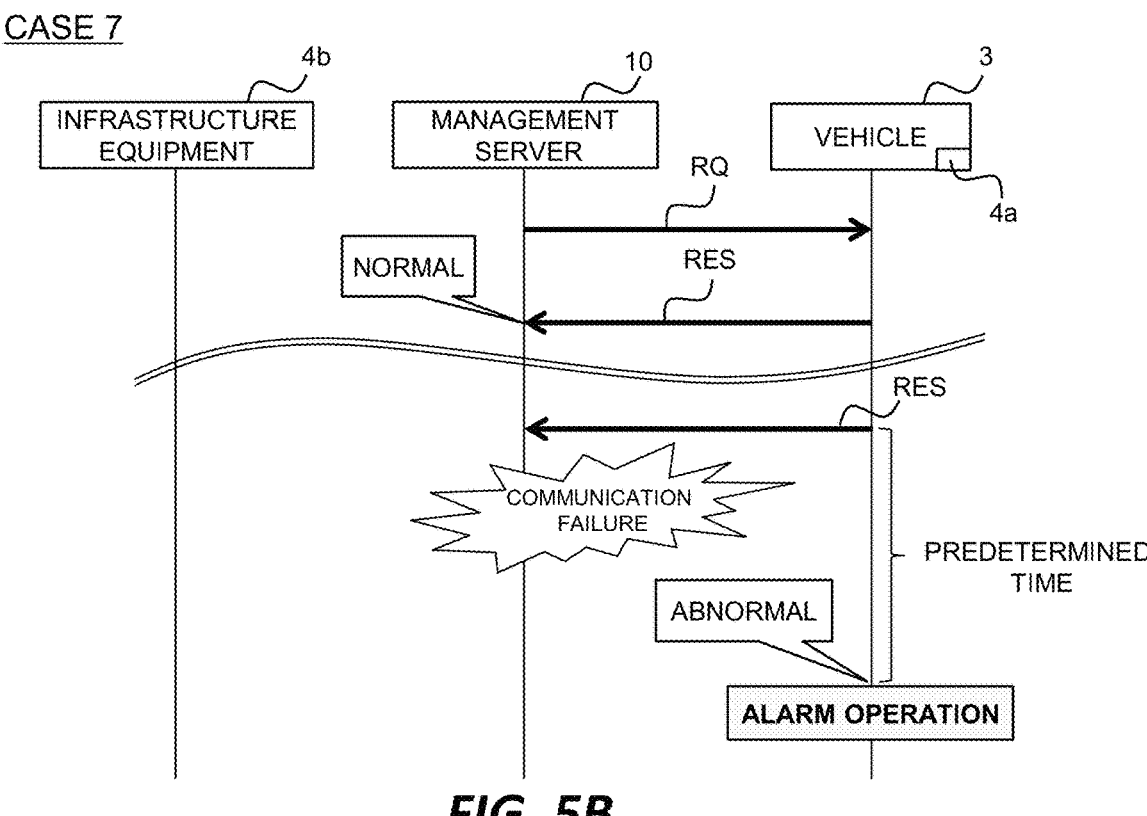
FIG. 5B is a sequence diagram showing an example of processing of the management system according to the embodiment.

FIG. 5A and FIG. 5B are sequence diagrams illustrating a processing example of the second example in the management system 1 according to the embodiment. Specifically, FIG. 5A shows a sequence diagram in the case 6 described above, and FIG. 5B shows a sequence diagram in the case 7 described above. Each of these will be described in detail below.

First, the details of FIG. 5A will be described. The management server 10 transmits a request RQ to the vehicle 3. When the vehicle status information included in the response RES from the vehicle 3 received by the management server 10 is normal, the management server 10 does not execute control for operating the alarm 4 corresponding to the vehicle 3.

Thereafter, as shown in FIG. 5A, when the communication state between the management server 10 and the vehicle 3 is bad, it is assumed that the vehicle 3 cannot receive the request RQ from the management server 10 even when a predetermined time elapses after the vehicle 3 transmits the response RES to the management server 10. However, when the vehicle status information is normal, it is not necessary to notify the surroundings of the state of the vehicle 3. Therefore, even when the time period in which the request RQ is not received from the management server 10 exceeds the predetermined time, the car 3 does not execute the control to operate the first alarm 4a of the own car when the car status information is normal.

Next, the details of FIG. 5B will be described. As in FIG. 5A, a case where the vehicle 3 does not receive the request RQ from the management server 10 even when a predetermined time elapses after the vehicle 3 transmits the response RES to the management server 10 will be considered. In this case, when the vehicle status information is abnormal, an event that requires confirmation of the state of the vehicle 3 has occurred. Therefore, when the time period in which the request RQ is not received from the management server 10 exceeds the predetermined time and the car status information is abnormal, the car 3 executes control to operate the first alarm 4a of the car.

4. PROCESSING EXAMPLE (FLOWCHART)

4-1. First Example

FIG. 6A is a flowchart illustrating a processing example of the first example of the management system 1 according to the embodiment. Specifically, FIG. 6A illustrates an example of processing performed by the management server 10 in the management system 1.

In step S100, the management server 10 transmits a request RQ to the vehicles 3 in the parking lot 2. Thereafter, the process proceeds to step S110.

In step S110, the management server 10 determines whether or not the response RES is received from the vehicles 3. When it is determined that the response RES from the car 3 is received (Yes in step S110), the process proceeds to step S120. Otherwise (No in step S110), the process proceeds to step S140.

In step S120, the management server 10 determines whether or not the vehicular status information included in the response RES is abnormal. When it is determined that the vehicle-status information is abnormal (step S120; Yes), the process proceeds to step S130. Otherwise (step S120; No), the process is terminated.

In step S130, the management server 10 executes control to activate at least one of the first alarm 4a and the second alarm 4b corresponding to the vehicles 3.

In step S140, the management server 10 executes control for operating the second alarm 4b corresponding to the vehicles 3 that do not have the response RES.

4-2. Second Example

FIG. 6B is a flowchart illustrating an example of a process of the vehicle 3 in the management system 1 according to the embodiment. Specifically, FIG. 6B illustrates an example of processing of the vehicle 3 in the management system 1.

In step S200, the vehicles 3 determine whether or not a time zone in which the request RQ from the management server 10 is not received exceeds a predetermined time. If it is determined that the time zone exceeds the predetermined time (Yes at Step S200), the process proceeds to Step S210. Otherwise (No in step S200), the process proceeds to step S230.

In step S210, the car 3 determines whether the car status information is abnormal. When it is determined that the vehicle-status information is abnormal (step S210; Yes), the process proceeds to step S220. Otherwise (step S210; No), the process is terminated. In step S220, the car 3 executes control for operating the first alarm 4a of the car.

In step S230, the vehicles 3 transmit responses RES to the requests RQ to the management server 10. Thereafter, the process proceeds to step S110 described above.

5. EFFECT

According to the management system 1 of the embodiment, when an event that requires confirmation of the state of the vehicles 3 occurs, control is performed to activate at least one of the first alarm 4a and the second alarm 4b corresponding to the vehicles 3. Thus, the presence of the vehicle 3 in which the event has occurred can be notified to the surroundings. Therefore, the location of the vehicle can be quickly specified, and thus the time for finding the vehicle 3 in which the event has occurred can be shortened. Further, when the vehicle 3 in which the event has occurred is in a dangerous failure state, it is possible to minimize damage to the surroundings by quickly notifying the surroundings of the danger.

6. OTHER EMBODIMENTS

The management system 1 may perform control to operate at least one of the first alarm 4a and the second alarm 4b corresponding to the vehicles 3, and may transmit the position information of the vehicles 3 in which the event has occurred to the mobile terminals carried by the staff of the parking lot 2. Thus, the staff of the parking lot 2 can more accurately recognize the position of the vehicle 3 in which the event has occurred. Therefore, the time for finding the vehicle 3 in which the event has occurred is further shortened.

What is claimed is:

1. A management system for managing a parking lot providing an automated parking service to a vehicle, the management system comprising:

a management server that is separate from the vehicle and configured to wirelessly communicate with the vehicle in the parking lot, a first alarm that is provided on the vehicle and emits sound or light or both in response to an instruction from the management server, and a second alarm that is provided as infrastructure installed in the parking lot and that is configured to identify a parking frame in which the vehicle is parked in the parking lot by emitting sound or light or both in response to an instruction from the management server, wherein the management server is configured to: (i) wirelessly transmit a request to the vehicle to respond to the request; (ii) cause neither of the first and second alarms to activate when the vehicle wirelessly responds to the request by indicating that a state of the vehicle is normal; (iii) wirelessly transmit the instruction to one or both of the first and second alarms to cause one or both of the first and second alarms to activate to emit the sound or the light or both when the vehicle wirelessly responds to the request by indicating that the state of the vehicle is abnormal; and (iv) wirelessly transmit the instruction to only the second alarm to cause only the second alarm to activate to emit the sound or the light or both when no response is received from the vehicle in response to the request.

2. The management system according to claim 1, wherein the vehicle is configured to activate the first alarm when the vehicle has not received the request from the management server after a predetermined time period has elapsed and the state of the vehicle is abnormal.

3. The management system according to claim 1, wherein the management server is configured to change an operation mode of one or both of the first and second alarms in accordance with a degree of failure of the vehicle.

4. The management system according to claim 1, wherein the management server is configured to transmit information on a vehicle position of the vehicle to a portable terminal carried by a staff of the parking lot when one or both of the first and second alarms are instructed to activate.

* * * * *